(12) United States Patent
Yehezkel et al.

(10) Patent No.: US 12,044,769 B2
(45) Date of Patent: Jul. 23, 2024

(54) ELECTRONIC DEVICES WITH LOW SIGNAL-TO-NOISE RATIO RANGE MEASUREMENT CAPABILITIES

(71) Applicant: Apple Inc., Cupertino, CA (US)

(72) Inventors: Avihay Yehezkel, Herzliya (IL);
Michael Kerner, Tel Monnd (IL);
Michael Delishansky, Herzliya (IL);
Michael Ney, Be'er Sheva (IL);
Shachar Shayovitz, Herzliya (IL);
Zohar Agon, Tel Aviv-Jaffa (IL)

(73) Assignee: Apple Inc., Cupertino, CA (US)

( * ) Notice: Subject to any disclaimer, the term of this patent is extended or adjusted under 35 U.S.C. 154(b) by 356 days.

(21) Appl. No.: 17/364,590

(22) Filed: Jun. 30, 2021

(65) Prior Publication Data
US 2023/0003867 A1    Jan. 5, 2023

(51) Int. Cl.
*G01S 13/34*    (2006.01)
*G01S 7/35*    (2006.01)
*G01S 13/58*    (2006.01)

(52) U.S. Cl.
CPC ............. *G01S 13/34* (2013.01); *G01S 7/354* (2013.01); *G01S 13/584* (2013.01)

(58) Field of Classification Search
USPC ........................................................ 342/91
See application file for complete search history.

(56) References Cited

U.S. PATENT DOCUMENTS

| | | | |
|---|---|---|---|
| 11,126,885 B2* | 9/2021 | Santra | G06V 40/28 |
| 11,300,656 B2* | 4/2022 | Chandrasekaran | G01S 13/88 |
| 11,639,985 B2* | 5/2023 | Tzadok | G01S 7/411 |
| | | | 342/195 |

OTHER PUBLICATIONS

Muhammad Z. Ikram et al., High-Accuracy Distance Measurement Using Millimeter-Wave Radar, Texas Instruments Incorporated, 2018, pp. 1296-1300, Dallas, Texas.

* cited by examiner

*Primary Examiner* — James R Hulka
*Assistant Examiner* — Brandon James Henson
(74) *Attorney, Agent, or Firm* — Treyz Law Group, P.C.; Michael H. Lyons

(57) ABSTRACT

An electronic device may include wireless circuitry with sensing circuitry that transmits radio-frequency sensing signals and receives reflected radio-frequency sensing signals. A mixer may generate a series of beat signals based on the sensing signals and the reflected sensing signals. The sensing circuitry may generate a beat phase based on an average of the series of beat signals, a set of phase values based on the series of beat signals, and a phase velocity based on the set of phase values. The sensing circuitry may resolve a phase ambiguity in the beat phase based on the phase velocity to identify a range between the electronic device and an external object. This way may allow the sensing circuitry to generate accurate ranges even in a low signal-to-noise ratio regime, such as when the external object is moving relative to the electronic device.

20 Claims, 9 Drawing Sheets

ELECTRONIC DEVICES WITH LOW SIGNAL-TO-NOISE RATIO RANGE MEASUREMENT CAPABILITIES

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals transmitted by the antennas.

In some scenarios, the wireless circuitry is also used to perform sensing operations to detect the distance between an external object and the electronic device. It can be particularly difficult to detect this distance with high accuracy, particularly when the external object is in motion.

SUMMARY

An electronic device may include wireless circuitry controlled by one or more processors. The wireless circuitry may include communications circuitry for performing wireless communications. The wireless circuitry may include sensing circuitry having a sensing transmitter and a sensing receiver for performing sensing operations. The wireless circuitry may include a set of antennas. The sensing circuitry may transmit radio-frequency sensing signals such as chirp signals. The sensing circuitry may receive reflected radio-frequency sensing signals such as reflected chirp signals. Mixer circuitry may mix the sensing signals with the reflected sensing signals to generate a series of beat signals.

The sensing receiver may generate a beat phase based on an average of the series of beat signals. The sensing receiver may generate a set of phase values based on the series of beat signals, where each phase value in the set of phase values is generated using a respective beat signal in the series of beat signals. The sensing receiver may generate a beat phase velocity of the series of beat signals based on the set of phase values. The sensing receiver may resolve a phase ambiguity in the beat phase for identifying a range between the electronic device and an external object. For example, the sensing receiver may generate a phase ambiguity resolution value based on the phase velocity, the beat phase, and a previous beat phase generated for an earlier series of beat signals. The sensing receiver may identify the range based on the phase ambiguity resolution value, the beat phase, the previous beat phase, and a previous range value associated with the previous beat phase. Using phase velocity to resolve phase ambiguity in this way may allow the sensing circuitry to generate accurate ranges even in a low signal-to-noise ratio regime, such as when the external object is moving relative to the electronic device.

An aspect of the disclosure provides an electronic device. The electronic device can include one or more antennas configured to transmit radio-frequency sensing signals and configured to receive reflected radio-frequency sensing signals (e.g., where different antennas transmit the radio-frequency sensing signals and receive the reflected radio-frequency sensing signals or where the same antenna transmits the radio-frequency sensing signals and receives the reflected radio-frequency sensing signals). The electronic device can include a mixer configured to generate beat signals based on the radio-frequency sensing signals and the reflected radio-frequency sensing signals. The electronic device can include one or more processors configured to identify a range between the electronic device and an external object based on a beat phase of the beat signals and a beat phase velocity of the beat signals.

An aspect of the disclosure provides a method of operating an electronic device having antennas, a mixer, and one or more processors. The method can include with the mixer, generating a series of beat signals from radio-frequency sensing signals transmitted by one or more of the antennas and a reflected version of the radio-frequency sensing signals received by one or more of the antennas. The method can include with the one or more processors, generating a beat phase from an average of the series of beat signals. The method can include with the one or more processors, generating a phase velocity of the series of beat signals. The method can include with the one or more processors, generating a range value associated with a distance between the electronic device and an external object based on the beat phase and the phase velocity.

An aspect of the disclosure provides a non-transitory computer-readable storage medium storing one or more programs configured to be executed by at least one processor on an electronic device. The one or more programs can include instructions that, when executed by the at least one processor, cause the at least one processor to generate an average value of a series of beat signals associated with radio-frequency sensing signals transmitted and received by the electronic device. The one or more programs can include instructions that, when executed by the at least one processor, cause the at least one processor to generate a beat phase based on the average value. The one or more programs can include instructions that, when executed by the at least one processor, cause the at least one processor to generate a set of phase values, wherein each phase value in the set of phase values is generated based on a respective beat signal in the series of beat signals. The one or more programs can include instructions that, when executed by the at least one processor, cause the at least one processor to generate a beat phase velocity based on the set of phase values. The one or more programs can include instructions that, when executed by the at least one processor, cause the at least one processor to identify a range between the electronic device and an external object based on the beat phase and the beat phase velocity.

DETAILED DESCRIPTION

Figure 1:
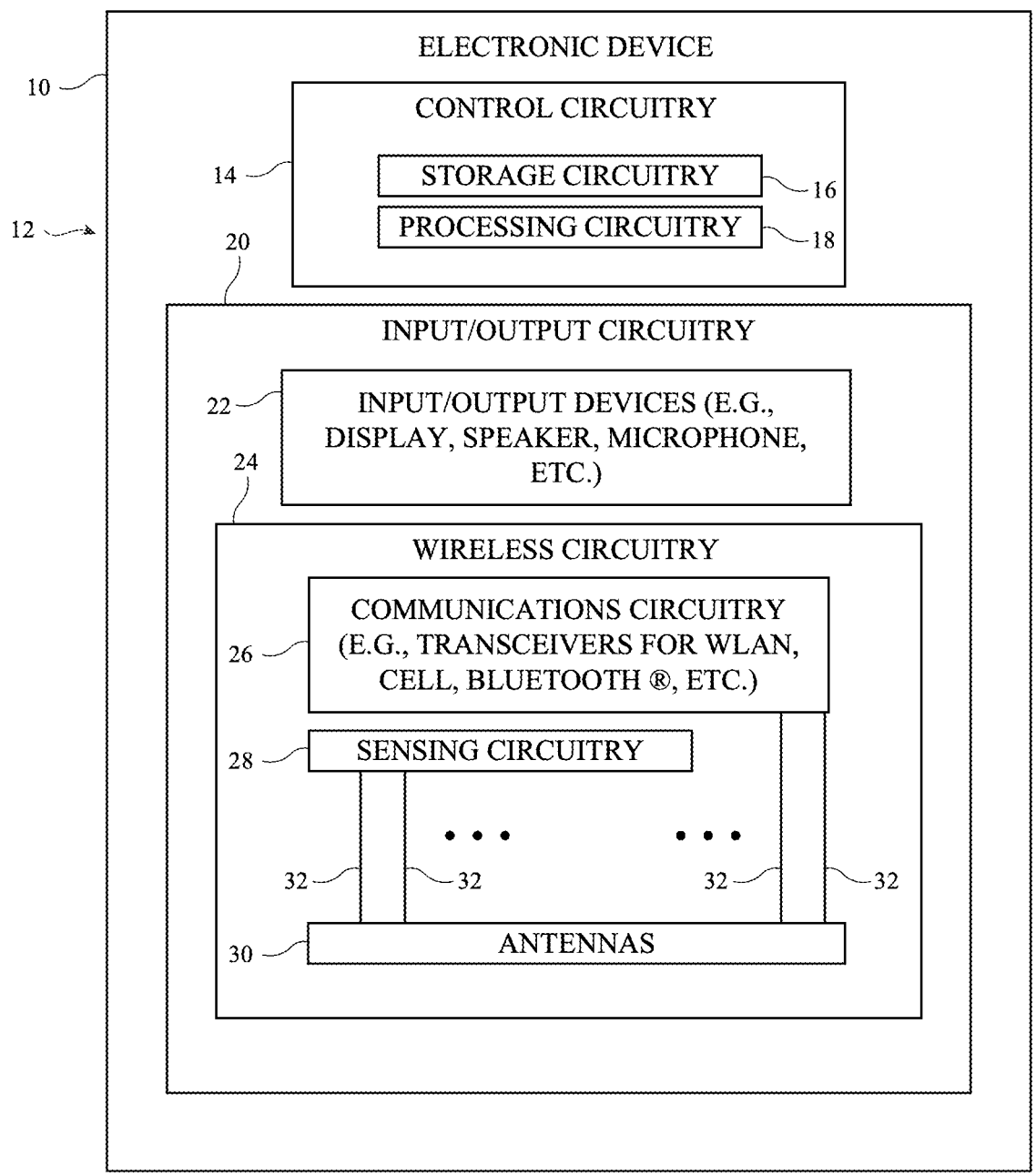
FIG. 1 is a block diagram of an illustrative electronic device having communications circuitry for performing wireless communications using antennas and having sensing circuitry for performing sensing operations using the antennas in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications and radio-based sensing operations. Wireless circuitry 24 (sometimes referred to herein as wireless communications circuitry 24) may include two or more antennas 30. Wireless circuitry 24 may also include baseband processor circuitry, transceiver circuitry, amplifier circuitry, filter circuitry, switching circuitry, analog-to-digital converter (ADC) circuitry, digital-to-analog converter (DAC) circuitry, radio-frequency transmission lines, and/or any other circuitry for transmitting and/or receiving radio-frequency signals using antennas 30.

Antennas 30 may be formed using any desired antenna structures for conveying radio-frequency signals. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time. If desired, two or more of antennas 30 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given pointing direction. The term "convey radio-frequency signals" as used herein means the transmission and/or reception of the radio-frequency signals (e.g., for performing unidirectional and/or bidirectional wireless communications with external wireless communications equipment). Antennas 30 may transmit the radio-frequency signals by radiating the radio-frequency signals into free space (or to free space through intervening device structures such as a dielectric cover layer). Antennas 30 may additionally or alternatively receive the radio-frequency signals from free space (e.g., through intervening devices structures such as a dielectric cover layer). The transmission and reception of radio-frequency signals by antennas 30 each involve the excitation or resonance of antenna currents on an antenna resonating element in the antenna by the radio-frequency signals within the frequency band(s) of operation of the antenna.

Wireless circuitry 24 may include communications circuitry 26 (sometimes referred to herein as wireless communications circuitry 26) for transmitting and/or receiving wireless communications data using antennas 30. Communications circuitry 26 may include baseband circuitry (e.g., one or more baseband processors) and one or more radios (e.g., radio-frequency transceivers, modems, etc.) for conveying radio-frequency signals using one or more antennas 30. Communications circuitry 26 may use antennas 30 to transmit and/or receive radio-frequency signals that convey the wireless communications data between device 10 and external wireless communications equipment (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Communications circuitry 26 may transmit and/or receive radio-frequency signals within corresponding frequency bands at radio frequencies (sometimes referred to herein as communications bands or simply as "bands"). The frequency bands handled by communications circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

In addition to conveying wireless communications data, wireless circuitry 24 may also use antennas 30 to perform radio-frequency sensing operations (sometimes referred to herein as radio-based sensing operations or simply as sensing operations). The sensing operations may allow device 10 to detect (e.g., sense or identify) the presence, location, orientation, and/or velocity (motion) of objects external to device 10. Detecting, sensing, or identifying the presence, location, orientation, and/or velocity (motion) of an external object at any given time or over a given time period may sometimes be referred to herein simply as detecting the external object or performing spatial ranging operations. The sensing operations may be performed over a relatively short range such as ranges of a few cm from antennas 30 (e.g., using voltage standing wave ratio detector(s) coupled to antennas 30) or over longer ranges such as ranges of dozens of cm, a few meters, dozens of meters, etc. In one implementation that is described herein as an example, the sensing operations may detect the location of the external object as the distance (sometimes referred to herein as range R) between device 10 (e.g., antennas 30) and the external object.

Control circuitry 14 may use the detected presence, location, orientation, and/or velocity of the external objects to perform any desired device operations. As examples, control circuitry 14 may use the detected presence, location (e.g., range R), orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer a radio-frequency signal beam produced by antennas 30 for communications circuitry 26 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc.

Wireless circuitry 24 may include sensing circuitry 28 for performing sensing operations using antennas 30. Sensing circuitry 28 may include a sensing transmitter (e.g., transmitter circuitry including signal generators, synthesizers, etc.), a sensing receiver, mixer circuitry, amplifier circuitry, filter circuitry, baseband circuitry, ADC circuitry, DAC circuitry, and/or any other desired components used in performing sensing operations using antennas 30. Sensing circuitry 28 may perform the sensing operations using radio-frequency sensing signals that are transmitted by antennas 30 and using reflected versions of the radio-frequency sensing signals that have reflected off external objects around device 10 (e.g., using a frequency-modulated continuous-wave (FMCW) scheme, a full-duplex ranging scheme, etc.). Antennas 30 may include separate antennas for conveying wireless communications data for communications circuitry 26 and for conveying sensing signals or may include one or more antennas 30 that are used to both convey wireless communications data and to perform sensing operations. Using a single antenna 30 to both convey wireless communications data and perform sensing operations may, for example, serve to minimize the amount of space occupied in device 10 by antennas 30.

Sensing circuitry 28 may be coupled to antennas 30 over at least two radio-frequency transmission line paths 32. Communications circuitry 26 may be coupled to antennas 30 over at least one radio-frequency transmission line path 32. Separate radio-frequency transmission line paths 32 may couple sensing circuitry 28 and communications circuitry 26 to antennas 30 (e.g., as shown in FIG. 1) or one or more radio-frequency transmission line paths 32 may couple one or more antennas 30 to both sensing circuitry 28 and communications circuitry 26. Radio-frequency transmission line paths 32 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission line paths 32 may be integrated into rigid and/or flexible printed circuit boards if desired. Radio-frequency front end (RFFE) modules may be interposed on one or more radio-frequency transmission line paths 32. The radio-frequency front end modules may include substrates, integrated circuits, chips, or packages that are separate from sensing circuitry 28 and communications circuitry 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission line paths 32.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of communications circuitry 26 and/or sensing circuitry 28. The baseband circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 24.

Figure 2:
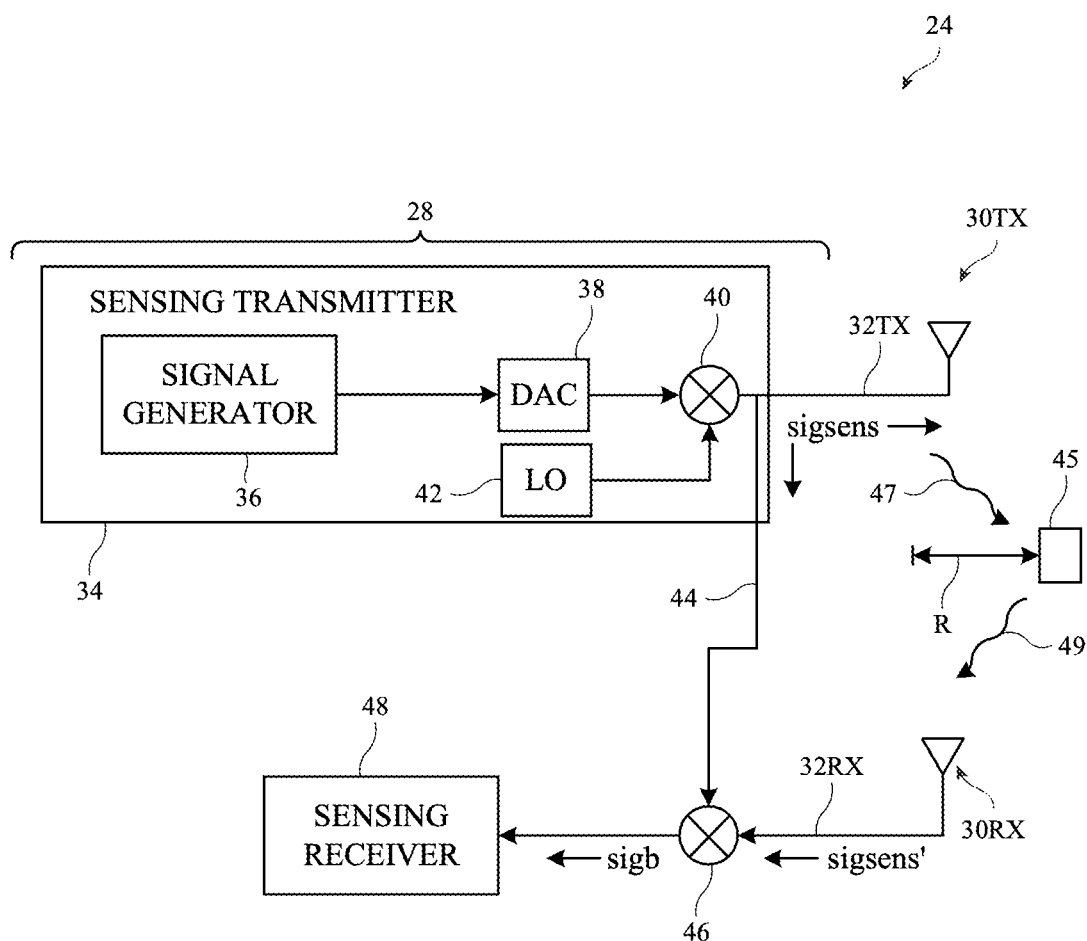
FIG. 2 is a circuit block diagram of illustrative sensing circuitry that transmits sensing signals over a transmit antenna and that receives reflected sensing signals over a receive antenna to measure the range between an electronic device and an external object in accordance with some embodiments.

FIG. 2 is a circuit block diagram showing one example of the components that may be included in sensing circuitry 28. As shown in FIG. 2, sensing circuitry 28 may include at least one sensing transmitter 34 and at least one sensing receiver 48. Sensing transmitter 34 may be coupled to a first antenna 30 such as antenna 30TX (sometimes referred to herein as transmit antenna 30TX) over radio-frequency transmission line path 32TX (sometimes referred to herein as transmit path 32TX). Sensing receiver 48 may be coupled to a second antenna 30 such as antenna 30RX (sometimes referred to herein as receive antenna 30RX) over radio-frequency transmission line path 32RX (sometimes referred to herein as receive path 32RX). Transmit antenna 30TX may also be used to transmit and/or receive radio-frequency signals that convey wireless communications data for communications circuitry 26 (FIG. 1) if desired. Similarly, receive antenna 30RX may also be used to transmit and/or receive radio-frequency signals that convey wireless communications data for communications circuitry 26 if desired. The transmit antenna and the receive antenna may be the same antenna or portions of the same antenna if desired. One or more power amplifiers may be interposed on transmit path 32TX. One or more low noise amplifiers may be interposed on receive path 32RX.

Sensing transmitter 34 may transmit radio-frequency sensing signals sigsens over transmit path 32TX and transmit antenna 30TX. Sensing signals sigsens may include any desired signals for performing spatial ranging operations (e.g., chirp signals, one or more tones, continuous waves of radio-frequency energy, etc.). Sensing signals sigsens may be transmitted using any desired carrier frequencies (e.g., frequencies greater than 10 GHz, greater than 20 GHz, less than 60 GHz, less than 10 GHz, less than 6 GHz, less than 1 GHz, etc.). An implementation in which sensing signals sigsens include chirp signals is described herein as an example. Chirp signals include frequency ramps (sometimes referred to as chirps) that periodically ramp-up over time. In this example, sensing transmitter 34 may include a signal generator or synthesizer such as signal generator 36 (e.g., a digital chirp generator). Signal generator 36 may generate the chirp signals and may provide the chirp signals to DAC 38. DAC 38 may convert the chirp signals to the analog domain and may provide the analog chirp signals to mixer 40. Mixer 40 may up-convert the analog chirp signals to radio frequencies (as sensing signals sigsens) using a clocking signal such as a local oscillator signal produced by local oscillator (LO) 42. Antenna 30TX may radiate sensing signals sigsens as radio-frequency signals 47. Unlike the radio-frequency signals transmitted by communications circuitry 26 of FIG. 1, sensing signals sigsens and radio-frequency signals 47 may be free from wireless communications data (e.g., cellular communications data packets, WLAN communications data packets, etc.).

Radio-frequency signals 47 may reflect off objects external to device 10, such as external object 45, as reflected signals 49. External object 45 may be, for example, the ground, a building, part of a building, a wall, furniture, a ceiling, a person, a body part (e.g., the head, hand, or other body part of the user of device 10 or other humans in the vicinity of device 10), an animal, a vehicle, a landscape or geographic feature, an obstacle, external communications equipment, another device of the same type as device 10 or a peripheral/accessory device such as a gaming controller, stylus (e.g., for providing input to a touch and/or force-sensitive display on device 10), or remote control, or any other physical object or entity that is external to device 10.

As shown in FIG. 2, sensing circuitry 28 may include a mixer such as mixer 46. Mixer 46 may have a first input coupled to transmit path 32TX over de-chirp path 44 and may have a second input coupled to receive path 32RX. The output of mixer 46 may be coupled to the input of sensing receiver 48. Mixer 46 may sometimes be referred to herein as de-chirp mixer 46. Receive antenna 30RX may receive reflected signals 49 (e.g., a reflected version of radio-frequency signals 47 that has reflected off external object 45) and may pass the reflected signals to mixer 46 in sensing circuitry 24 over receive path 32RX (e.g., as reflected sensing signals sigsens'). Reflected sensing signals sigsens' may include sensing signals sigsens (e.g., chirp signals) that have reflected off external object 45 and that have been received by receive antenna 30RX. Transmit path 32TX may include a coupler or signal splitter that couples some of the sensing signals sigsens on transmit path 32TX onto de-chirp path 44. If desired, one or more amplifiers (not shown) may be interposed on de-chirp path 44 to boost the amplitude of the sensing signals sigsens provided to de-chirp mixer 46.

De-chirp mixer 46 may receive reflected sensing signals sigsens' at its second input (e.g., from receive path 32RX). De-chirp mixer 46 may mix the sensing signals sigsens received at its first input (over de-chirp path 44) with the reflected sensing signals sigsens' received at its second input (over receive path 32RX) to produce or generate baseband signals sigb. Baseband signals sigb may correspond to beats associated with the difference in phase between the transmitted sensing signals sigsens and the received reflected sensing signals sigsens'. Baseband signals sigb may therefore sometimes be referred to herein as beat signals sigb.

Figure 3:
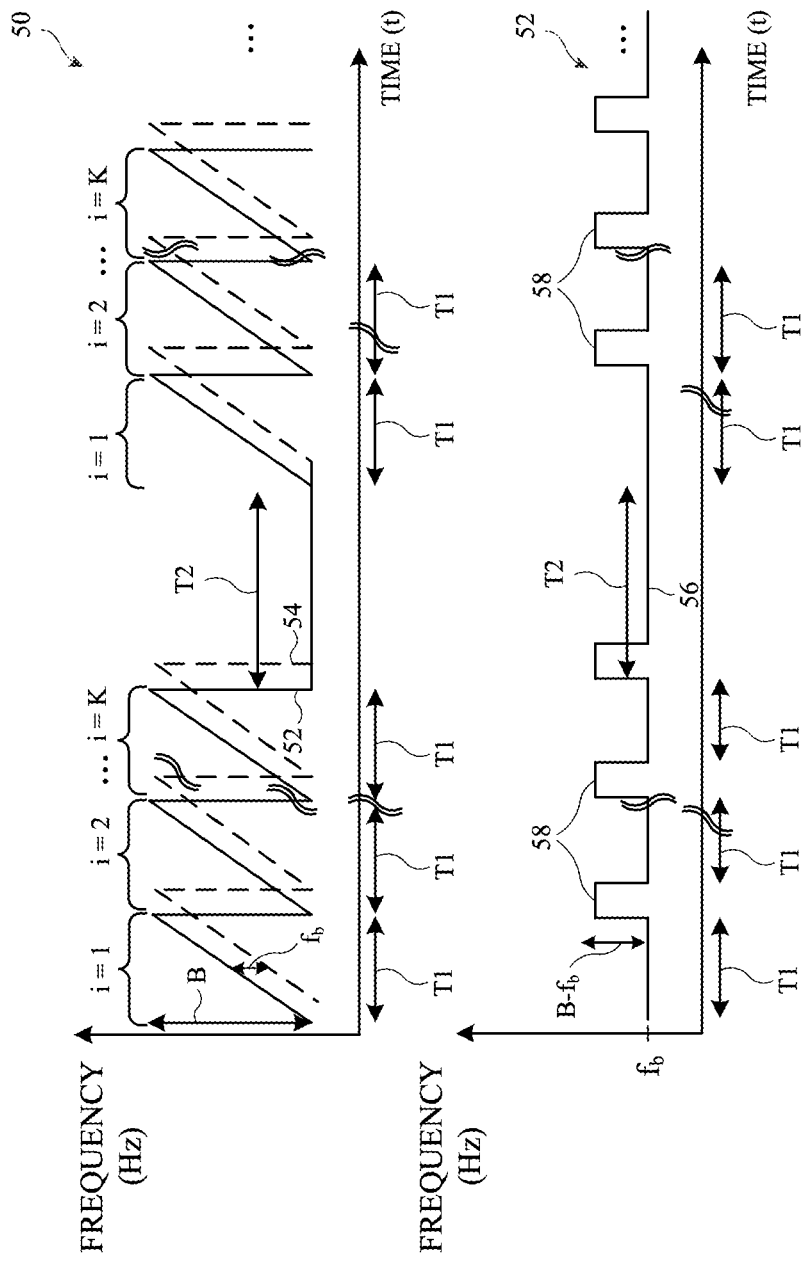
FIG. 3 includes plots of frequency as a function of time for illustrative transmitted and received sensing signals that may be mixed to produce a series of beat signals for detecting the range between an electronic device and an external object in accordance with some embodiments.

Sensing receiver 48 may receive beat signals sigb from de-chirp mixer 46. Sensing receiver 48 may process beat signals sigb to identify/detect the presence, location, orientation, and/or velocity of external object 45 (FIG. 3). In one implementation that is described herein as an example, sensing receiver 48 may process beat signals sigb to identify the range R between device 10 and external object 45.

The example of FIG. 2 is merely illustrative. If desired, de-chirp mixer 46 may be formed as a part of sensing receiver 48. If desired, the second input of de-chirp mixer 46 may be coupled to the output of an ADC in sensing receiver 48 and de-chirp path 44 may be coupled to the input of DAC 38. Other sensing circuitry (spatial ranging) architectures may be used if desired.

FIG. 3 includes plots of frequency as a function of time (t) for one example of the sensing signals and beat signals handled by sensing circuitry 28. Curve 52 of plot 50 plots illustrative chirp signals that may be transmitted as sensing signals sigsens. Curve 54 of plot 50 plots illustrative reflected chirp signals that may be received by de-chirp mixer 46 in reflected sensing signals sigsens'.

As shown by curve 52, the chirp signals in sensing signals sigsens may include periodic linear frequency ramps or chirps. Each ramp (chirp) has a bandwidth B and lasts for a chirp duration T1 (e.g., each chirp has a slope equal to B/T1). Sensing transmitter 34 may transmit a series of K chirps (e.g., a first chirp i=1 during a first chirp duration T1, a second chirp i=2 during a second chirp duration T1, a Kth chirp i=K during a Kth chirp duration T1, etc.) for use in identifying the range R between device 10 and external object 45.

As shown by curve 54, the received reflected chirp signals are offset from the transmitted chirp signals in time due to the propagation of the chirp signals over-the-air in reflecting off of external object 45. This causes the received reflected chirp signals to also be offset from the transmitted chirp signals by frequency difference $f_b$. De-chirp mixer 46 may mix the chirp signals associated with curve 52 with the chirp signals associated with curve 54 to generate beat signals sigb.

Curve 58 of plot 52 plots illustrative beat signals sigb that may be produced by de-chirp mixer 46 by mixing the chirp signals associated with curve 52 with the chirp signals associated with curve 54. As shown by curve 58, beat signals sigb are at a beat frequency that is equal to frequency difference $f_b$. Frequency different $f_b$ may therefore sometimes be referred to herein as beat frequency $f_b$. Beat signals sigb may also include pulses of bandwidth $B-f_b$ for each chirp duration T1 (e.g., due to the transition from the maximum value at the end of each chirp signal to the minimum value at the beginning of the next chirp signal). In other words, de-chirp mixer 46 may produce K beat signals sigb from the K chirp signals transmitted in sensing signals sigsens and the K reflected chirp signals received in reflected sensing signals sigsens'. Sensing receiver 48 may process the K beat signals sigb to identify range R between device 10 and external object 45.

Once the Kth chirp signal has been transmitted, a subsequent series of K chirp signals may be transmitted after a time period T2 has elapsed (e.g., as shown by curve 52 of plot 50). Time period T2 may, for example, allow processing time for sensing receiver 48 to identify range R based on beat signals sigb and/or may help to reduce power consumption on device 10. Sensing receiver 48 may use the subsequent series of K chirp signals, the K corresponding reflected chirp signals, and the K corresponding beat signals sigb to identify range R again (e.g., to track whether external object 45 has moved relative to device 10 between the first series of K chirps and the second series of K chirps). Sensing receiver 48 may store each range R value that is produced (e.g., to track the location of external object 45 relative to device 10 over time). This process may repeat any desired number of times to allow sensing circuitry 28 to continue to gather measurements of range R over time. The example of FIG. 3 is merely illustrative. Other waveforms may be used in sensing signals sigsens if desired. In other words, curves 52 and 54 of plot 50 may have other shapes. Curve 58 of plot 52 may have other shapes in practice.

Figure 4:
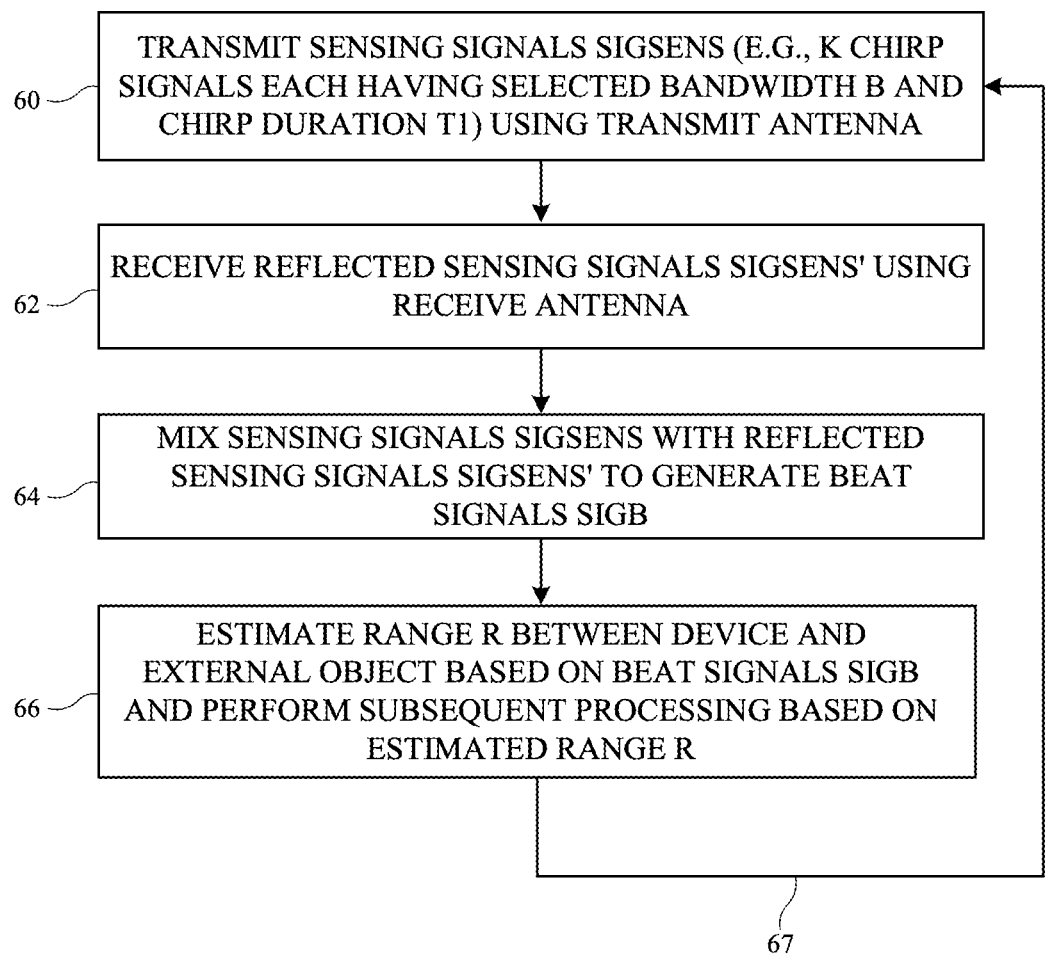
FIG. 4 is a flow chart of illustrative operations involved in measuring the range between an electronic device and an external object using sensing circuitry that transmits sensing signals and that receives reflected sensing signals in accordance with some embodiments.

FIG. 4 is a flow chart of illustrative operations involved in using sensing circuitry 28 to identify range R. At operation 60, sensing transmitter 34 (FIG. 2) may transmit sensing signals sigsens over transmit antenna 30TX. Sensing signals sigsens may, for example, include the K chirp signals associated with curve 52 of FIG. 3.

At operation 62, receive antenna 30RX may receive reflected sensing signals sigsens'. Reflected sensing signals sigsens' may, for example, include the K reflected chirp signals associated with curve 54 of FIG. 3.

At operation 64, de-chirp mixer 46 may mix the reflected sensing signals sigsens' with the transmitted sensing signals sigsens to generate (e.g., produce, output, etc.) beat signals sigb. Beat signals sigb may, for example, include the K beat signals sigb associated with curve 58 of FIG. 3.

At operation 66, sensing receiver 48 may estimate (e.g., generate, determine, identify, produce, output, compute, calculate, etc.) the range R between device 10 and external object 45 based on beat signals sigb (e.g., the K beat signals sig associated with curve 58 of FIG. 3). Sensing circuitry 28 may store range R (e.g., in a range measurement database) for subsequent processing. Control circuitry 14 may perform any desired processing operations based on range R. As examples, control circuitry 14 may use range R to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., when the one or more antennas 30 is being blocked by or is in close proximity to a human body part), to determine how to steer a radio-frequency signal beam produced by antennas 30 for communications circuitry 26 (e.g., to steer a signal beam formed by the antennas around external object 45 and/or towards external communications equipment), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc.

Processing may subsequently loop back to operation 60 via path 67 and sensing circuitry 28 may transmit the next series of K chirp signals. This may allow device 10 to continue to track range R and thus the location of external object 45 over time. Operation 66 may, for example, be performed during a corresponding time period T2 between the transmission of different series of K chirp signals (e.g., between iterations of operations 60-62). Operations 60, 62, and/or 64 may be performed concurrently.

Figure 5:
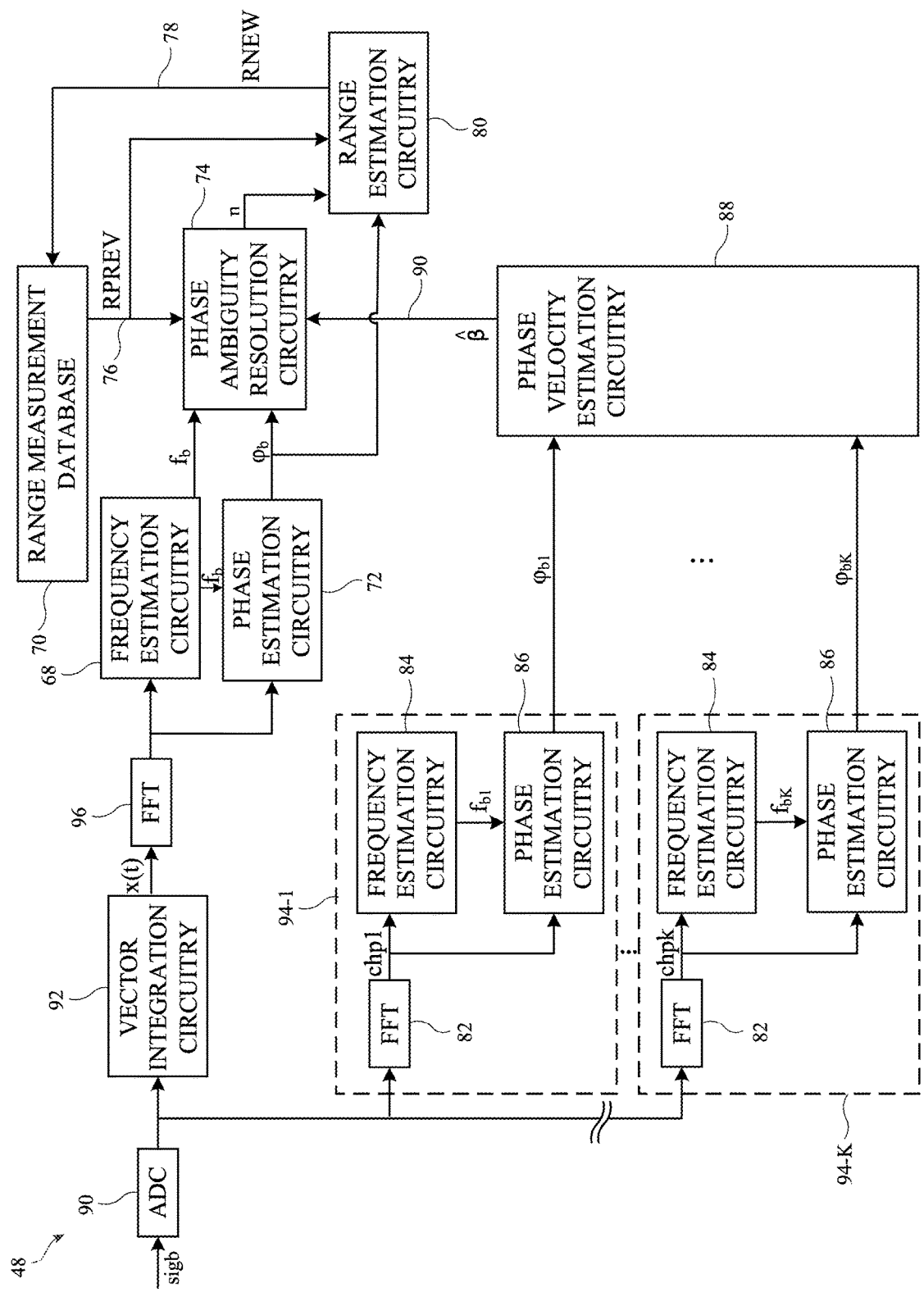
FIG. 5 is a circuit block diagram of illustrative sensing circuitry having components for identifying the range between an electronic device and an external object based on the phase velocity of a series of beat signals in accordance with some embodiments.

FIG. 5 is a circuit block diagram of sensing receiver 48. As shown in FIG. 5, sensing receiver 48 may include an ADC such as ADC 90, vector integration circuitry 92, fast Fourier transform (FFT) circuitry such as FFT 96, frequency estimation circuitry 68, phase estimation circuitry 72, phase ambiguity resolution circuitry 74, range measurement database 70, range estimation circuitry 80, phase velocity estimation circuitry 88, and K beat processing chains 94 (e.g., a first beat processing chain 94-1, a Kth beat processing chain 94-K, etc.). Each of the K beat processing chains 94 may include respective FFT circuitry such as FFT 82, frequency estimation circuitry 84, and phase estimation circuitry 86.

Vector integration circuitry 92 may sometimes be referred to herein as vector integrator 92 or vector integration engine 92. Frequency estimation circuitry 68 and frequency estimation circuitry 84 may sometimes each be referred to herein as a frequency estimator, frequency generator, frequency generation circuitry, or frequency estimation engine. Phase estimation circuitry 72 and phase estimation circuitry 86 may sometimes each be referred to herein as a phase estimator, phase generator, phase generation circuitry, or phase estimation engine. Phase ambiguity resolution circuitry 74 may sometimes be referred to herein as phase ambiguity resolver 74, phase ambiguity solver 74, phase ambiguity resolution engine 74, phase ambiguity solving engine 74, or phase ambiguity solving circuitry 74. Range estimation circuitry 80 may sometimes be referred to herein as range estimator 80 or range estimation engine 80. Beat processing chains 94 may sometimes be referred to herein as beat processing circuits 94, beat phase estimator circuits 94, or beat phase estimator chains 94. Phase velocity estimation circuitry 88 may sometimes be referred to herein as phase velocity estimator 88, phase velocity generator 88, phase velocity estimation engine 88, or phase velocity generation circuitry 88.

Range measurement database 70 may be hard-coded or soft-coded into sensing receiver 48 (e.g., in storage circuitry 16 of FIG. 1) and may include a database, data table, or any other desired data structure. Range measurement database 70 may store the range values R generated by sensing receiver 48 as well as corresponding phase measurements (e.g., beat phases) generated by sensing receiver 48, as examples. The entries of range measurement database 70 may be populated and updated during the operation of device 10 over time (e.g., as new range values R are generated). Vector integrator 92, FFT 96, frequency estimator 68, phase estimator 72, phase ambiguity resolver 74, range estimator 80, beat processing chains 94 (e.g., FFTs 82, frequency estimators 84, and phase estimators 86), and phase velocity estimator 88 may be implemented in software (e.g., running on storage circuitry and executed by one or more processors) and/or in hardware (e.g., using one or more logic gates, adders, subtractors, multipliers, dividers, other circuit components, diodes, transistors, switches, arithmetic logic units (ALUs), registers, application-specific integrated circuits, field-programable gate arrays, one or more processors, look-up tables, etc.). Some or all of these components may form part of control circuitry 14 of FIG. 1, for example.

As shown in FIG. 5, ADC 90 may have an input that receives beat signal sigb (e.g., from de-chirp mixer 46 of FIG. 2). The output of ADC 90 may be coupled to the input of vector integrator 92. The K beat processing chains 94 may be coupled in parallel between the output of ADC 90 and the input of phase velocity estimation circuitry 88 (e.g., the output of ADC 90 may be coupled to the inputs of beat processing chains 94). The output of vector integrator 92 may be coupled to the input of FFT 96. The output of FFT 96 may be coupled to the input of frequency estimator 68 and to an input of phase estimator 72. The output of frequency estimator 68 may be coupled to an input of phase estimator 72 and to an input of phase ambiguity resolver 74. The output of phase estimator 72 may be coupled to an input of phase ambiguity resolver 74 and to an input of range estimator 80. Range measurement database 70 may be coupled to an input of phase ambiguity resolver 74 and to an input of range estimator 80 over path 76. The output of phase ambiguity resolver 74 may also be coupled to an input of range estimator 80. Range estimator 80 may have an output coupled to range measurement database 70 (e.g., over path 78) and/or outputs coupled to other portions of control circuitry 14 (FIG. 1). Any desired paths may be used to couple the components of FIG. 5 together (e.g., signal paths, data paths, control paths, data buses, logical/virtual paths defined in software, etc.).

When sensing receiver 48 receives beat signals sigb (e.g., a series of K beat signals as shown by curve 58 of FIG. 3), ADC 90 may convert the beat signals sigb to the digital domain.

Sensing receiver 48 may receive beat signals sigb during operations 64-66 of FIG. 4, for example. ADC 90 may provide the digital beat signals to vector integrator 92 and to beat processing chains 94 for identifying range R based on the series of K beat signals.

Vector integrator 92 may average each of the K beat signals received from ADC 90 together to generate (e.g., calculate, compute, output, produce, etc.) time-averaged signals x(t) (e.g., by performing vector integration on the K beat signals). Averaged signals x(t) may be represented mathematically by equation 1, for example.

$$x(t) = A e^{j(2\pi f_b t + \phi_b)} \qquad (1)$$

In equation 1, A is a scalar amplitude, j is the square root of −1, t is time, and $\phi_b$ is the phase of averaged signals x(t). $\phi_b$ may sometimes be referred to herein as beat phase $\phi_b$ (e.g., the phase of the averaged beat signals). Averaging the K beat signals may serve to improve the signal-to-noise ratio (SNR) of the phase measurement used for identifying range R, for example. Longer integration times are generally associated with higher SNR and shorter integration times are generally associated with lower SNR, particularly when external object 45 is moving. Vector integrator 92 may provide averaged signals x(t) to FFT 96.

FFT 96 may convert averaged signals x(t) to the frequency domain (e.g., as a sinc function having a peak in frequency at beat frequency $f_b$). If desired, zero-padding circuitry on FFT 96 may zero-pad the averaged signals for interpolation in converting the averaged signals to the frequency domain. FFT 96 may provide the frequency domain averaged signals to frequency estimator 68 and phase estimator 72.

Frequency estimator 68 may estimate beat frequency $f_b$ based on the frequency domain averaged signals received from FFT 96. For example, frequency estimator 68 may identify beat frequency $f_b$ by identifying the frequency that corresponds to the peak value of the output of FFT 96. Frequency estimator 68 may provide beat frequency $f_b$ to phase ambiguity resolver 74 and phase estimator 72. If desired, phase ambiguity resolver 74 may pass the beat frequency $f_b$ estimated by frequency estimator 68 to range estimation circuitry 80. Range estimation circuitry 80 may estimate a coarse range $R_{fb}$ (e.g., a range R that is estimated based on beat frequency $f_b$ only but not phase information) using equation 2.

$$R_{fb} = \frac{c * T1 * f_b}{2B} \qquad (2)$$

In equation 2, c is the speed of light. This is a very coarse range estimate dependent upon beat frequency $f_b$ that does not consider beat phase $\phi_b$. Combining phase information such as beat phase $\phi_b$ with the beat frequency may produce estimates of range R that are considerably more accurate than the coarse range $R_{fb}$ estimated only using beat frequency $f_b$.

Phase estimator 72 may therefore estimate beat phase $\phi_b$ based on the frequency domain averaged signals received from FFT 96 to increase the accuracy of the range R estimated by range estimator 80. Phase estimator 72 may, for example, estimate beat phase $\phi_b$ by measuring the phase corresponding to the peak value of the output of FFT 96. Equation 3 describes the relation between range R and beat phase $\phi_b$.

$$\phi_b = 2\pi f_{min} * \frac{2R}{c} = \frac{4\pi R}{\lambda} \qquad (3)$$

In equation 3, $f_{min}$ is the starting FMCW ramp frequency (e.g., the lowest frequency in each of the K chirp signals corresponding to curve 52 of FIG. 3) and λ is the corresponding wavelength. As shown by equation 3, beat phase $\phi_b$ contains distance information (e.g., because beat phase $\phi_b$ is dependent upon the range R to be estimated). Direct estimation of range R using beat phase $\phi_b$ may therefore become challenging, due to phase wrapping that produces multiple solutions and thus phase ambiguity. For example, for $f_{min}$=60 GHz, there may be phase wrapping every $$\frac{\lambda}{2} = 2.5 \text{ mm}.$$

Phase ambiguity resolver 74 may resolve this phase ambiguity. For example, phase ambiguity resolver 74 may generate a phase ambiguity resolution value m according to equation 4.

$$m = \text{round}\left(\frac{R_{fb} - R_{initial}}{\frac{\lambda}{2}} - \frac{\phi_b - \phi_{initial}}{2\pi}\right) \qquad (4)$$

In equation 4, round( ) is a rounding function that rounds its argument to the nearest integer, $R_{initial}$ is an earlier gathered range value R (e.g., for the immediately previous series of K beat signals sigb or for an earlier series of K beat signals sigb), and $\phi_{initial}$ is an earlier beat phase estimated by phase estimator 72 (e.g., for the immediately previous series of K beat signals sigb or for an earlier series of K beat signals sigb). Phase ambiguity resolver 74 may pass phase ambiguity resolution value m to range estimator 80.

Range estimator 80 may estimate range R (e.g., an estimate that is more accurate than coarse range $R_{fb}$) based on the beat phase $\phi_b$ estimated by phase estimator 72 and phase ambiguity resolution value m. For example, range estimator 80 may estimate range R using equation 5.

$$R = R_{initial} + m * \frac{\lambda}{2} + \frac{(\phi_b - \phi_{initial}) * \lambda}{4\pi} \qquad (5)$$

The range R estimated by range estimator 80 according to equation 5 (e.g., based on both beat phase $\phi_b$ and coarse range $R_{fb}$, which is a factor in phase ambiguity resolution value m) is more accurate than the coarse range $R_{fb}$ estimated based on beat frequency $f_b$ alone. As an example, for $f_{min}$=60 GHz and B=5.28 GHz, the range R estimated using equation 5 may be 19 times more accurate than coarse range $R_{fb}$ (e.g., where sqrt($3f_{min}^2/B^2$=sqrt ($3*60^2/5.28^2$)=19).

However, estimating range R using only beat frequency $f_b$ and beat phase $\phi_b$ in this way (e.g., without considering beat phase velocity) can only be applied if coarse range $R_{fb}$ is accurate enough to resolve the phase ambiguity. This may be possible only when the Cramer-Rao Lower Bound (CRLB) of $R_{fb}$ is less than or equal to $1.25^2$ mm$^2$, which corresponds to SNRs that are greater than or equal to about 25 dB. In other words, equations 1-5 may be used to estimate range R when the SNR of the averaged signals produced by vector integrator 92 are about 25 dB or greater.

However, in practice, sensing circuitry 28 may need to identify range R in a low SNR regime (e.g., where the SNR of the averaged signals produced by vector integrator 92 is less than 25 dB). For example, in scenarios where external object 45 is moving, the integration interval used by vector integrator 92 may be too short to produce a sufficiently high SNR. Under these conditions, the range estimation based on phase information is still very accurate, but the frequency estimation (e.g., beat frequency $f_b$) is not accurate enough to resolve the phase ambiguity. To resolve the phase ambiguity and therefore generate accurate estimates of range R in the low SNR regime despite beat frequency $f_b$ being insufficiently accurate on its own to resolve the phase ambiguity, sensing receiver 48 may identify range R based on the beat phase velocity $\hat{\beta}$ of the received beat signals in addition to beat frequency $f_b$ and beat phase $\phi_b$. Beat phase velocity $\hat{\beta}$ may sometimes also be referred to herein simply as phase velocity $\hat{\beta}$.

As shown in FIG. 5, sensing receiver 48 may include beat processing chains 94 and phase velocity estimator 88 for identifying beat phase velocity $\hat{\beta}$ based on the K beat signals output by ADC 90. Each beat processing chain 94 may receive and/or operate on a respective one of the K beat signals output by ADC 90 (e.g., beat processing chain 94-1 may process the first of the beat signals, beat processing chain 94-K may process the Kth of the beat signals, etc.). Each beat processing chain 94 may identify the beat phase $\phi_{bi}$ for its respective (e.g., ith) beat signal and thus for a respective one of the K chirps that produced the beat signal (e.g., beat processing chain 94-1 may identify beat phase $\phi_{b1}$ of the first beat signal and thus the first chirp, beat processing chain 94-K may identify beat phase $\phi_{bK}$ of the Kth beat signal and thus the Kth chirp, etc.). The K beat processing chains 94 may generate the beat phases in parallel (e.g., concurrently).

The FFT 82 in each beat processing chain 94 may convert its beat signal to the frequency domain as a respective frequency domain signal chp (e.g., the FFT 82 in beat processing chain 94-1 may output frequency domain signal chp1, the FFT 82 in beat processing chain 94-K may output frequency domain signal chpk, etc.). The beat signal input to FFT 82 (prior to conversion to the frequency domain) may be described mathematically by the right side of equation 1. If desired, zero-padding circuitry in each FFT 82 may perform zero-padding on its respective beat signal for interpolation in converting the beat signal to the frequency domain. Frequency domain signals chp may be, for example, sinc functions having a peak in frequency at the respective beat frequency $f_{bi}$ of the corresponding beat signal.

The frequency estimator 84 in each beat processing chain 94 may identify (e.g., estimate, generate, calculate, compute, determine, deduce, output, etc.) the beat frequency $f_{bi}$ of the beat signal received by that beat processing chain 94 (e.g., the frequency estimator 84 in beat processing chain 94-1 may identify the beat frequency $f_{b1}$ of the first beat signal in the series of K beat signals, the frequency estimator 84 in beat processing chain 94-K may identify the beat frequency $f_{bK}$ of the Kth beat signal in the series of K beat signals, etc.). Frequency estimators 84 may identify beat frequencies $f_{bi}$ by identifying the frequencies of the peaks of the outputs of FFTs 82 (e.g., the frequency of the peak of the curve shown in FIG. 6). The frequency estimators 84 may pass beat frequencies $f_{bi}$ to the phase estimator 86 in its beat processing chain 94.

The phase estimator 86 in each beat processing chain 94 may identify (e.g., estimate, generate, calculate, compute, determine, deduce, output, etc.) the beat phase $\phi_{bi}$ of the beat signal received by that beat processing chain 94 (e.g., the phase estimator 86 in beat processing chain 94-1 may identify the beat phase $\phi_{b1}$ of the first beat signal in the series of K beat signals, the frequency estimator 86 in beat processing chain 94-K may identify the beat phase $\phi_{bK}$ of the Kth beat signal in the series of K beat signals, etc.). Phase estimators 86 may identify beat phases $\phi_{bi}$ by identifying the phases of the peaks of the outputs of FFTs 82 (e.g., the phase of the peak of the curve shown in FIG. 6). The phase estimators 86 may pass beat phases $\phi_{bi}$ to phase velocity estimator 88 in parallel (e.g., the phase estimator 86 in beat processing chain 94-1 may pass beat phase $\phi_{b1}$ to phase velocity estimator 88, the phase estimator 86 in beat processing chain 94-K may pass beat phase $\phi_{bK}$ to phase velocity estimator 88, etc.). Operating on each of the K beat signals in parallel may optimize the timing efficiency of sensing receiver 48, for example.

Phase velocity estimator 88 may identify the phase velocity $\hat{\beta}$ of the series of K beat signals based on the beat phases of each of the K beat signals (e.g., based on the K beat phases $\phi_{bi}$ received from beat processing chains 94). The phase velocity may be a radial phase velocity, for example (e.g., phase velocity estimator 88 may be a radial phase velocity estimator). If desired, phase velocity estimator 88 may identify phase velocity $\hat{\beta}$ by performing a first-order polynomial fitting (e.g., a linear fit) over the K beat phases $\phi_{bi}$ received from beat processing chains 94 (e.g., where the phase velocity is defined by the slope of the linear fit). For example, phase velocity estimator 88 may generate (e.g., compute, calculate, generate, identify, produce, output, etc.) phase velocity $\hat{\beta}$, in units of radians per second, using equation 6.

$$\hat{\beta} = \frac{\sum_{i=1}^{K}\left(i - \frac{K+1}{2}\right)(\phi_{bi} - \overline{\phi}_b)}{T1 * \sum_{i=1}^{K}\left(i - \frac{K+1}{2}\right)^2} \tag{6}$$

In equation 6, $\overline{\phi}_b$ is the average of the K beat phases $\phi_{bi}$ and i is the integer index value from 1 to K. Phase velocity estimator 88 may pass phase velocity $\hat{\beta}$ to phase ambiguity resolver 74.

Phase ambiguity resolver 74 and range estimator 80 may receive previous range information RPREV from range measurement database 70 over path 76. Previous range information RPREV may include a previous range value $R_{previous}$ generated by sensing circuitry 48 for the previous series of K beat signals (e.g., for the immediately previous series of K beat signals sigb or for any earlier series of K beat signals sigb). Previous range information RPREV may also include a previous beat phase value $\phi_{previous}$. Previous beat phase value $\phi_{previous}$ may be the beat phase $\phi_b$ generated by phase estimator 72 for the previous series of K beat signals that were used to generate previous range value $R_{previous}$ (e.g., previous beat phase value $\phi_{previous}$ may be the beat phase $\phi_b$ used by sensing receiver 48 to generate previous range value $R_{previous}$). Phase ambiguity resolver 74 may resolve this phase ambiguity based on phase velocity $\hat{\beta}$ and the beat phase $\phi_b$ estimated by phase estimator 72 (e.g., for the current series of K beat signals) and based on previous range information RPREV (e.g., previous range value $R_{previous}$ and previous beat phase value $\phi_{previous}$). For example, phase ambiguity resolver 74 may generate (e.g., compute, calculate, identify, produce, output, etc.) a phase ambiguity resolution value n according to equation 7.

$$n = \text{round}\left(\frac{\hat{\beta}}{2\pi} * T2 - \frac{\phi_b - \phi_{previous}}{2\pi}\right) \quad (7)$$

Phase ambiguity resolver 74 may pass phase ambiguity resolution value n to range estimator 80.

Range estimator 80 may identify (e.g., estimate, calculate, compute, determine, generate, output, produce, etc.) the current range R between device 10 and external object 45 based on phase ambiguity resolution value n, previous range information RPREV (e.g., previous range value $R_{previous}$ and previous beat phase value $\phi_{previous}$), and the beat phase $\phi_b$ for the current series of K beat signals. For example, range estimator 80 may identify range R using equation 8.

$$R = R_{previous} + n * \frac{\lambda}{2} + \frac{(\phi_b - \phi_{previous}) * \lambda}{4\pi} \quad (8)$$

Range estimator 80 may pass range R to other portions of control circuitry 14 for further processing. If desired, range estimator 80 may provide current range information RNEW to range measurement database 70. Current range information RNEW may include beat phase $\phi_b$ (e.g., for use as previous beat phase value $\phi_{previous}$ during processing of a subsequent series of K beat signals) and range R (e.g., for use as previous range value $R_{previous}$ during processing of the subsequent series of K beat signals). Range measurement database 70 may store current range information RNEW (e.g., for use as previous range information RPREV during processing of a subsequent series of K beat signals).

Figure 6:
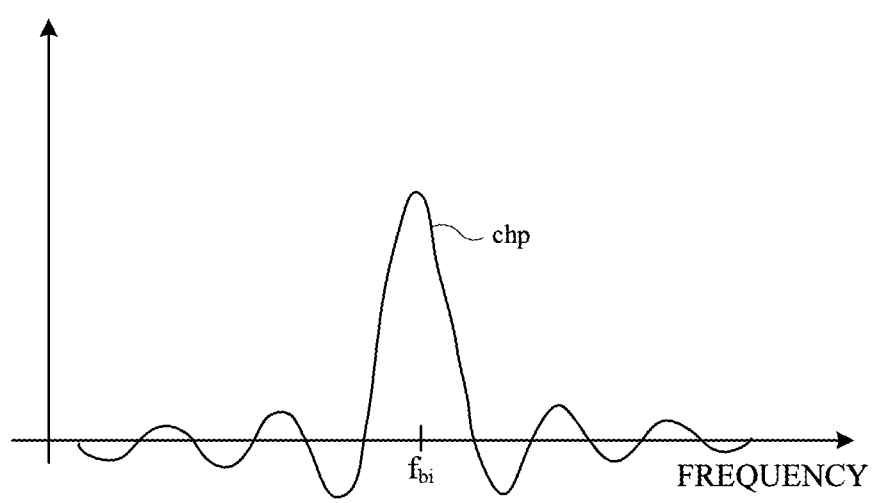
FIG. 6 is a plot of a beat signal in the frequency domain that may be processed by an illustrative beat processing chain to generate a phase of the beat signal in accordance with some embodiments.

FIG. 6 is a frequency space plot of a frequency domain signal chp that may be produced by the FFT 82 in a given one of beat signal processing chains 94. As shown in FIG. 6, frequency domain signal chp may be a sinc function having a peak at the corresponding beat frequency $f_{bi}$. Frequency estimator 84 may identify the beat frequency $f_{bi}$ of frequency domain signal chp. Phase estimator 86 may identify the phase of frequency domain signal chp (e.g., at beat frequency $f_{bi}$) as the beat phase $\phi_{bi}$ of frequency domain signal chp (e.g., the beat phase of the corresponding beat signal). The example of FIG. 6 is merely illustrative and the curve shown in FIG. 6 may have other shapes in practice.

Figure 7:
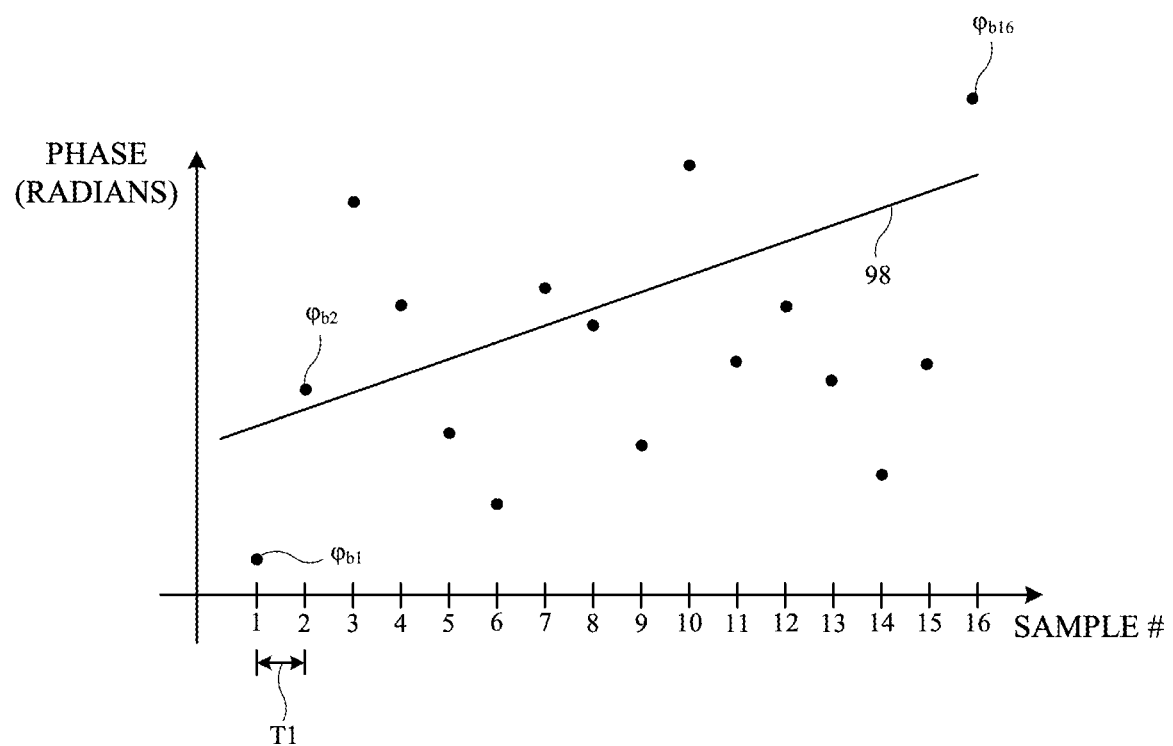
FIG. 7 is a plot of illustrative phases for a series of beat signals that may be processed to generate a phase velocity of the series of beat signals in accordance with some embodiments.

FIG. 7 is a plot showing how phase velocity estimator 88 may identify phase velocity $\hat{\beta}$ based on the K beat phases $\phi_{bi}$ received from beat processing chains 94. In the example of FIG. 7, K=16, sample number (index i) is plotted on the horizontal axis, and phase is plotted on the vertical axis (e.g., in radians). The horizontal axis may also represent time, because each sample is separated by chirp duration T1. Each of the K=16 beat phases $\phi_{bi}$ (e.g., a first beat phase a second beat phase $\phi_{b2}$, a $16^{th}$ beat phase $\phi_{b16}$, etc.) are plotted as points in FIG. 7. Phase velocity estimator 88 may fit the 16 beat phases $\phi_{bi}$ with first order polynomial (line) 98. Phase velocity $\hat{\beta}$ is represented by the slope of line 98. Phase velocity estimator 88 may therefore identify phase velocity $\hat{\beta}$ by identifying (e.g., generating, computing, calculating, producing, outputting, estimating, etc.) the slope of line 98 (e.g., according to equation 6). The example of FIG. 7 is merely illustrative. In practice, beat phases $\phi_{bi}$ may have other values. K may be any desired integer (e.g., less than 16, at least 2, at least 4, at least 8, greater than 16, at least 32, at least 64, at least 128, etc.).

Figure 8:
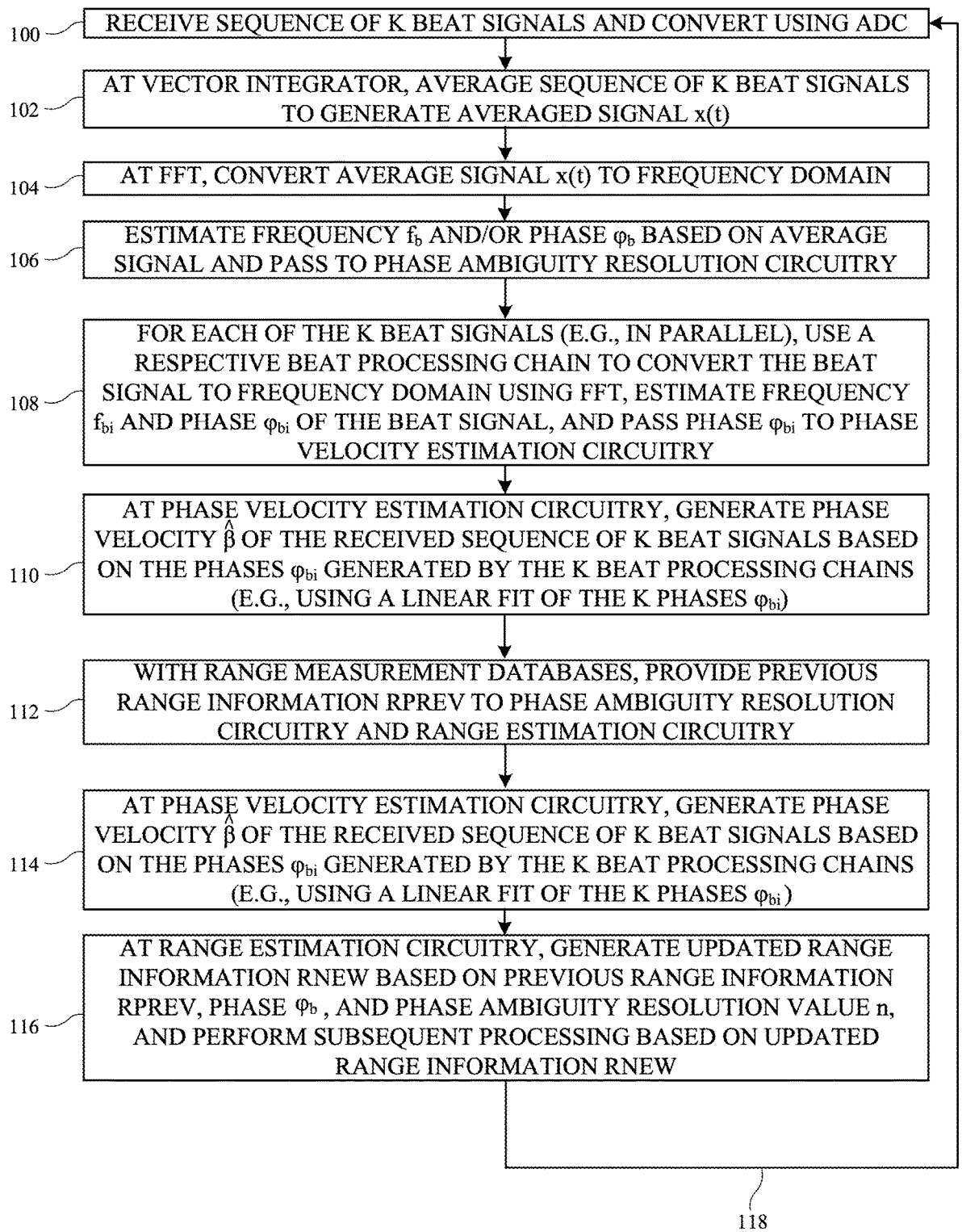
FIG. 8 is a flow chart of illustrative operations involved in identifying the range between an electronic device and an external object based on the phase velocity of a series of beat signals in accordance with some embodiments.

FIG. 8 is a flow chart of illustrative operations that may be performed by sensing circuitry 48 to generate range R from a series of K beat signals sigb. The operations of FIG. 8 may, for example, be performed while processing operation 66 of FIG. 4.

At operation 100, ADC 90 may receive a series (sequence) of K consecutive beat signals sigb. ADC 90 may convert the series of K beat signals to the digital domain and may pass the digital domain beat signals to vector integrator 92 and beat processing chains 94.

At operation 102, vector integrator 92 may average the series of K beat signals (in the digital domain) to generate averaged signals x(t).

At operation 104, FFT 96 may convert averaged signals x(t) to the frequency domain.

At operation 106, frequency estimator 68 may estimate (e.g., identify, determine, generate, produce, output, calculate, compute, etc.) beat frequency $f_b$ based on the averaged signals (in the frequency domain). Frequency estimator 68 may pass beat frequency $f_b$ to phase estimator 72 and phase ambiguity resolver 74. Phase estimator 72 may estimate (e.g., identify, determine, generate, produce, output, calculate, compute, etc.) beat phase $\phi_b$ based on the averaged signals (in the frequency domain). Phase estimator 72 may pass beat phase $\phi_b$ to phase ambiguity resolver 74 and range estimator 80.

At operation 108, each of the K beat phase processing chains 94 in sensing receiver 48 may generate a respective beat phase $\phi_{bi}$ based on a respective one of the K beat signals output by ADC 90 (e.g., in parallel). For example, the FFT 82 in each beat processing chain 94 may convert its beat signal to the frequency domain (e.g., as frequency domain signals chp). The frequency estimator 84 in each beat processing chain 94 may generate beat frequency $f_b$; based on frequency domain signals chp. The phase estimator 86 in each beat processing chain 94 may generate beat phase $\phi_{bi}$ based on frequency domain signals chp. Each beat processing chain 94 may pass its beat phase $\phi_{bi}$ to phase velocity estimator 88.

At operation 110, phase velocity estimator 88 may generate phase velocity $\hat{\beta}$ based on the K beat phases $\phi_{bi}$ received from beat processing chains 94. Phase velocity estimator 88 may generate phase velocity $\hat{\beta}$ using a linear fit of the K beat phases $\phi_{bi}$ over time (sample number) (e.g., according to equation 6). Phase velocity estimator 88 may pass phase velocity $\hat{\beta}$ to phase ambiguity resolver 74.

At operation 112, range measurement database 70 may provide previous range information RPREV to phase ambiguity resolver 74 and range estimator 80. Previous range information RPREV may include a previous range value $R_{previous}$ and a previous beat phase value $\phi_{previous}$ gathered from an earlier series of K beat signals (e.g., during an immediately previous iteration of the operations of FIG. 8 or during some earlier iteration).

At operation 114, phase ambiguity resolver 74 may resolve the phase ambiguity by generating phase ambiguity resolution value n based on phase velocity $\hat{\beta}$, beat phase $\phi_b$, and previous range information RPREV (e.g., according to equation 7). Phase ambiguity resolver 74 may pass phase ambiguity resolution value n to range estimator 80.

At operation 116, range estimator 80 may generate current (updated) range information RNEW based on previous range information RPREV, phase ambiguity resolution value n, and beat phase $\phi_b$ (e.g., according to equation 8). Current range information RNEW may include a current (updated) range value R and the current beat phase $\phi_b$, for example. Range estimator 80 may provide current range information RNEW to other portions of control circuitry 14 (FIG. 1) and/or to range measurement database 70 for storage. Processing may loop back to operation 100 via path 118 as a subsequent series of K beat signals is received at ADC 90. Current range information RNEW may form previous range information RPREV for the subsequent series of K beat signals (e.g., for the subsequent iteration of operations 100-116) and/or for later series of K beat signals, for example. The example of FIG. 8 is merely illustrative. Operations 102, 104, and/or 106 may be performed concurrently with operations 108, 110, and/or 112.

Generating current range information RNEW in this way may allow sensing receiver 48 to accurately measure range R to external device 45 in the low SNR regime (e.g., at SNRs below about 25 dB), such as in scenarios where external device 45 is in motion. If desired, measuring phase velocity for generating current range information RNEW may be omitted when SNR is in the high SNR domain (e.g., at SNRs above about 25 dB). In other words, sensing receiver 48 may measure range R based on beat frequency $f_b$ and/or beat phase $\phi_b$ in the high SNR regime (e.g., because beat frequency $f_b$ may be sufficient to resolve the phase ambiguity in beat phase $\phi_b$ in the high SNR domain) and may measure range R based on beat phase $\phi_b$ and/or the beat velocity in the low SNR regime.

Figure 9:
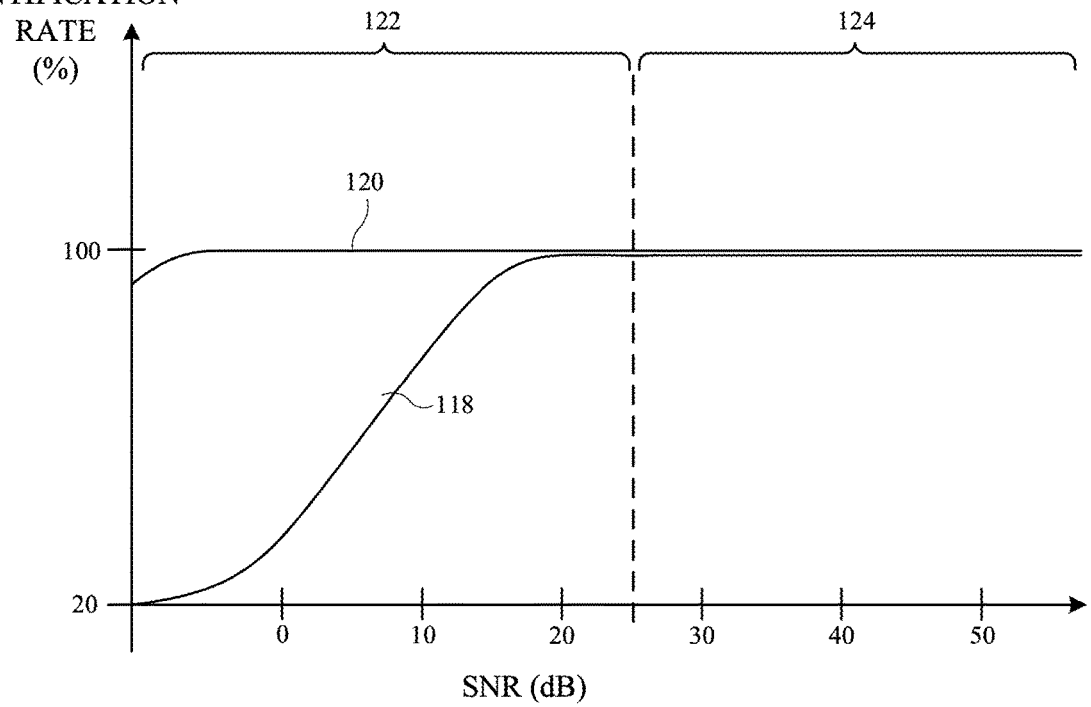
FIG. 9 is a plot of phase ambiguity identification rate as a function of signal-to-noise ratio showing how the phase velocity of a series of beat signals can optimize the performance of illustrative sensing circuitry in identifying the range between an electronic device and an external object in accordance with some embodiments.

FIG. 9 is a plot of phase ambiguity identification rate as a function of SNR showing how the measuring phase velocity may allow for accurate range measurements in the low SNR domain. Curve 118 plots the phase ambiguity identification (resolution) rate of sensing receiver 48 when estimating range R based only on beat frequency $f_b$ and beat phase $\phi_b$. As shown by curve 118, sensing receiver 48 may be able to resolve (identify) all or nearly all of the phase ambiguities in beat phase $\phi_b$ when in high SNR regime 124. However, the amount of phase ambiguities resolvable by sensing receiver 48 deteriorates as SNR decreases within low SNR regime 122.

Curve 120 plots the phase ambiguity identification (resolution) rate of sensing receiver 48 when identifying range R based on beat phase $\phi_b$ and phase velocity $\hat{\beta}$. As shown by curve 120, identifying range R using phase velocity $\hat{\beta}$ allows sensing circuitry 48 to resolve all or nearly all of the phase ambiguities in beat phase $\phi_b$, thereby producing accurate ranges R, in both high SNR regime 124 and low SNR regime 122. In other words, generating ranges R based at least on beat phase velocity $\hat{\beta}$ may minimize the presence of errors in ranges R even when SNR is relatively low (e.g., at or below 0 dB). Allowing for accurate measurement of ranges R at low SNR may allow device 10 to accurately track the location of external object 45 even if external object 45 is moving. This may allow sensing circuitry 48 to identify gesture inputs, stylus inputs, and/or perform any other desired processing tasks based on the position, orientation, range, and/or velocity of external object 45 even when external object 45 is moving relatively quickly relative to device 10. The example of FIG. 9 is merely illustrative. Curves 120 and 118 may have other shapes in practice.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-9 (e.g., the operations of FIGS. 4 and 8) may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry. While databases are sometimes described herein as providing data to other components (see, e.g., range measurement database 70 of FIG. 5), one or more processors, memory controllers, or other components may actively access the databases, may retrieve the stored data from the database, and may pass the retrieved data to the other components for corresponding processing.

The foregoing is merely illustrative and various modifications can be made to the described embodiments. The foregoing embodiments may be implemented individually or in any combination.

What is claimed is:

1. An electronic device comprising:
   one or more antennas configured to transmit radio-frequency sensing signals and configured to receive reflected radio-frequency sensing signals;
   a mixer configured to generate beat signals based on the radio-frequency sensing signals and the reflected radio-frequency sensing signals; and
   one or more processors configured to
   estimate a range between the electronic device and an external object based on a beat phase of the beat signals and a beat phase velocity of the beat signals, and
   resolve a phase ambiguity in the beat phase based on the beat phase velocity.

2. The electronic device of claim 1, wherein the radio-frequency sensing signals comprise a series of chirp signals, the reflected radio-frequency sensing signals comprise a series of reflected chirp signals, and the beat signals comprise a series of beat signals, each beat signal in the series of beat signals being generated based on a respective one of the chirp signals in the series of chirp signals and a respective one of the reflected chirp signals in the series of reflected chirp signals.

3. The electronic device of claim 2, the one or more processors being configured to generate a set of beat phase values in parallel and wherein the one or more processors is configured to generate each beat phase value in the set of beat phase values based on a respective beat signal in the series of beat signals.

4. The electronic device of claim 3, the one or more processors being configured to generate the beat phase velocity based on the set of beat phase values.

5. The electronic device of claim 4, the one or more processors being configured to generate the beat phase velocity by performing a linear fit over the set of beat phase values.

6. The electronic device of claim 4, the one or more processors being configured to:
average the series of beat signals to generate an averaged signal;
convert the averaged signal to a frequency domain; and
generate the beat phase based on the averaged signal in the frequency domain.

7. The electronic device of claim 6, the one or more processors being configured to estimate the range based on the beat phase and the beat phase velocity when a signal-to-noise ratio of the averaged signal is less than a threshold level.

8. The electronic device of claim 7, the one or more processors being configured to estimate the range based on the beat phase but not the beat phase velocity when the signal-to-noise ratio of the averaged signal exceeds the threshold level.

9. The electronic device of claim 1, the one or more processors being configured to:
generate a phase ambiguity resolution value by applying a rounding function to an argument that includes the beat phase velocity, the beat phase, and an additional beat phase; and
estimate the range based on the phase ambiguity resolution value, the beat phase, and a previous range between the electronic device and the external object estimated by the one or more processors, the previous range being estimated by the one or more processors based on the additional beat phase.

10. The electronic device of claim 1, wherein the sensing signals comprise a linear frequency ramp having a duration and the beat phase velocity is inversely proportional to the duration of the linear frequency ramp.

11. A method of operating an electronic device having antennas, a mixer, and one or more processors, the method comprising:
with the mixer, generating a series of beat signals from radio-frequency sensing signals transmitted by one or more of the antennas and a reflected version of the radio-frequency sensing signals received by one or more of the antennas;
with the one or more processors, generating a beat phase from an average of the series of beat signals;
with the one or more processors, generating a phase velocity of the series of beat signals; and
with the one or more processors, generating a range value associated with a distance between the electronic device and an external object based on the beat phase and the phase velocity.

12. The method of claim 11, wherein generating the phase velocity comprises:
generating a respective phase value of each beat signal in the series of beat signals in parallel; and
generating the phase velocity based on the phase values.

13. The method of claim 12, wherein generating the phase velocity based on the phase values comprises performing a linear fit of the phase values.

14. The method of claim 12, further comprising:
generating a phase ambiguity resolution value based on the phase velocity, the beat phase, and a previous beat phase associated with a previous series of beat signals generated by the mixer.

15. The method of claim 14, wherein generating the range value comprises:
generating the range value based on the phase ambiguity resolution value, the beat phase, the previous beat phase, and a previous range value generated by the one or more processors.

16. The method of claim 15, further comprising identifying an input gesture based at least on the range value and the previous range value.

17. The method of claim 15, further comprising:
with the one or more processors, generating the average of the series of beat signals by performing vector integration on the series of beat signals;
with the one or more processors, converting the average of the series of beat signals to a frequency domain average of the series of beat signals; and
with the one or more processors, generating the beat phase based on the frequency domain average of the series of beat signals.

18. A non-transitory computer-readable storage medium storing one or more programs configured to be executed by at least one processor on an electronic device, the one or more programs including instructions that, when executed by the at least one processor, cause the at least one processor to:
generate an average value of a series of beat signals associated with radio-frequency sensing signals transmitted and received by the electronic device;
generate a beat phase based on the average value;
generate a set of phase values, wherein each phase value in the set of phase values is generated based on a respective beat signal in the series of beat signals;
generate a beat phase velocity based on the set of phase values; and
estimate a range between the electronic device and an external object based on the beat phase and the beat phase velocity.

19. The non-transitory computer-readable storage medium of claim 18, the one or more programs including instructions that, when executed by the at least one processor, cause the at least one processor to:
resolve a phase ambiguity of the beat phase based on the beat phase velocity.

20. The non-transitory computer-readable storage medium of claim 19, the one or more programs including instructions that, when executed by the at least one processor, cause the at least one processor to:
generate a phase ambiguity resolution value based on the beat phase velocity, the beat phase, and a previous beat phase associated with a previous series of beat signals processed by the at least one processor; and
estimate the range based on the phase ambiguity resolution value, the beat phase, the previous beat phase, and a previous range between the electronic device and the external object estimated by the at least one processor.

* * * * *